Nov. 13, 1928.
W. F. ZIMMERMANN
1,691,694
SUPPORT FOR IMPLEMENT RETAINERS
Filed Jan. 28, 1928
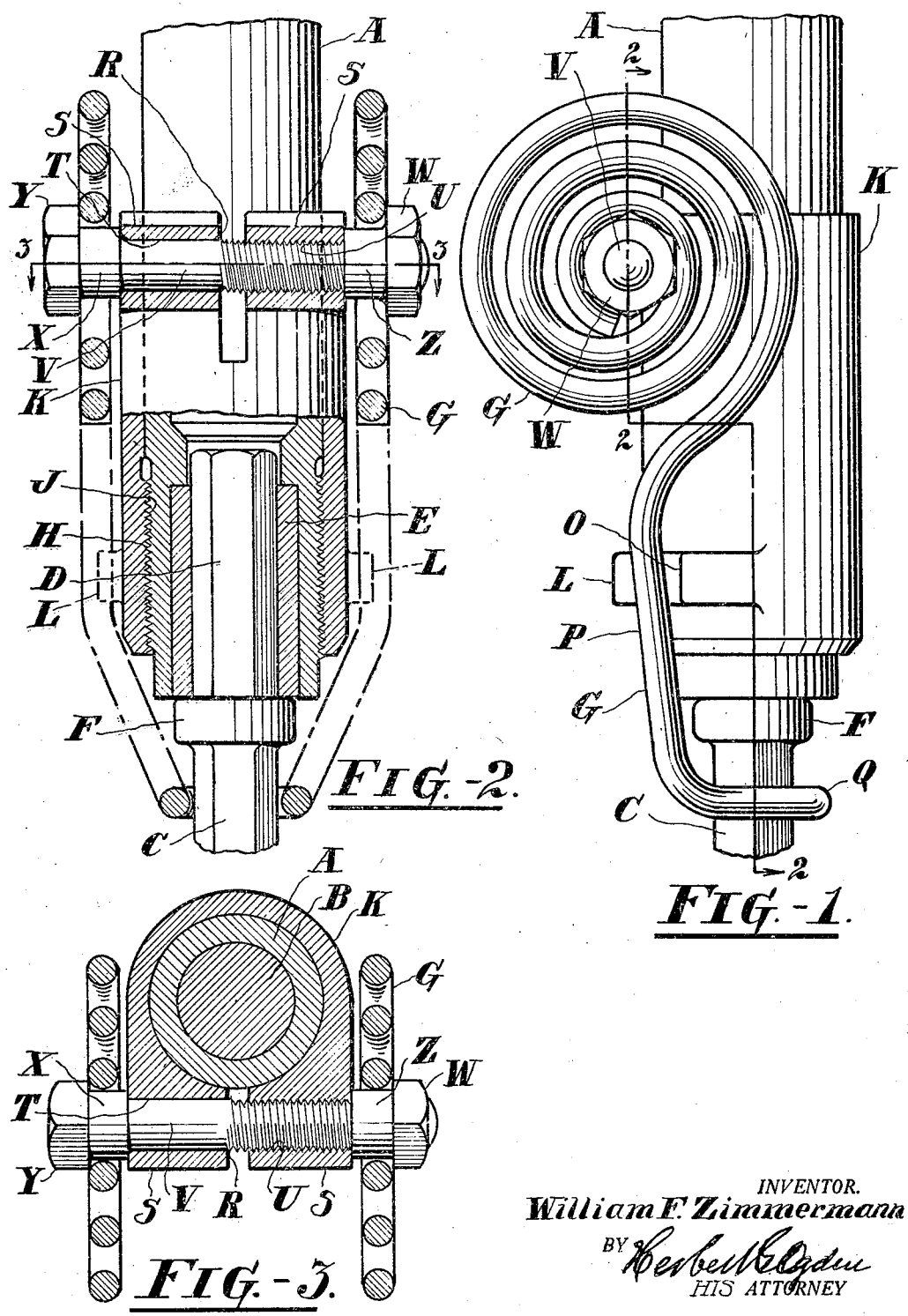
INVENTOR.
William F. Zimmermann
BY Herbert C. Ogden
HIS ATTORNEY Patented Nov. 13, 1928.

1,691,694

UNITED STATES PATENT OFFICE.

WILLIAM FRANK ZIMMERMANN, OF WAVERLY, NEW YORK, ASSIGNOR TO INGERSOLL-RAND COMPANY, OF JERSEY CITY, NEW JERSEY, A CORPORATION OF NEW JERSEY.

SUPPORT FOR IMPLEMENT RETAINERS.

Application filed January 28, 1928. Serial No 250,249.

This invention relates to pneumatic tools, but more particularly to a support adapted to be threaded or otherwise secured on the cylinder of pneumatic tools for supporting an implement retainer.

The object of the invention is to enable the use on pneumatic tools, such as coal picks, of implement retainers of the type commonly used on rock drills for maintaining the drill steel in the drill.

Other objects will be in part obvious and in part pointed out hereinafter.

In the accompanying drawings taken in conjunction with the following description, Figure 1 is an elevation of the front end of a pneumatic tool equipped with a support constructed in accordance with the practice of the invention, Figure 2 is an elevation of a pneumatic tool, partly in section, illustrating more fully the manner in which the implement retainer is supported, and Figure 3 is a transverse view taken through Figure 2 on the line 3—3 looking in the direction indicated by the arrows.

Referring to the drawings, A represents a cylinder of a pneumatic tool in which is disposed a reciprocatory hammer piston B adapted to deliver blows on a working implement C extending with its shank D into the cylinder A. A bushing E disposed in the front end of the cylinder forms a guide for the working implement. At the juncture of the body portion of the working implement C and the shank D is a collar F which abuts the front end of the tool to limit the distance which the shank D may extend into the cylinder A.

In accordance with the present invention, means are provided for forming a support for an implement retainer G of a well known type generally used on rock drills for maintaining the working implement in the drill. To this end the front end of the cylinder A is provided with exterior threads H for engagement with corresponding threads J formed in the front end of a sleeve K mounted on the cylinder A.

The sleeve K carries near its front end oppositely disposed lugs L in which are formed grooves O to engage the side arms P of the retainer G for the purpose of maintaining the yoke Q of the retainer in the retaining position, that is, in a position to encircle the working implement at a point forwardly of the collar F for which it forms an abutment.

In order to enable the sleeve K to be clamped securely in operative position on the cylinder A, a longitudinal slot R is formed in the rearward end of the sleeve K and on opposite sides of the slot R are enlargements S. In one enlargement S is formed a plain cylindrical hole T and in the other enlargemnt a threaded aperture U. A bolt V is extended through the hole T and threaded into the aperture U for clamping the rearward end of the sleeve K securely to the cylinder. A nut W threaded on the end of the bolt V serves as a lock nut for preventing unscrewing of the bolt.

The bolt V and the nut W also serve as pivotal points or trunnions for the retainer G. To this end the bolt V is provided with an enlarged cylindrical portion X adjacent the head Y of the bolt to form a pivot for one side arm of the retainer and a similar cylindrical portion Z is formed on the nut W to pivotally receive the other side arm P of the retainer.

In assembling the support on the cylinder, the sleeve K is screwed on the threads H of the cylinder and the bolt V is extended through one side arm P of the retainer and through the hole T and threaded into the aperture U to clamp the rearward end of the sleeve against the cylinder A. After these parts have been thus assembled the nut W may be threaded on the bolt V and the cylindrical portion Z of said nut will then engage the inner coil of the side arm through which it extends.

In connection with the foregoing, it may be stated that tools of the type to which the present invention is applied have heretofore been provided with sleeve retainers adapted to be threaded on the front end of the tool. These retainers have an aperture in their front end through which the tool extends. The disadvantage of sleeve retainers, however, is that whenever it is desired to change the working implement it becomes necessary to entirely unscrew the retainer. This obviously requires considerable time and causes unnecessary delays. The present invention entirely eliminates this objectionable feature and makes possible the instant withdrawal of the retaining device on tools of this type to change the working implement in the same manner as is customary in rock drills employing steel retainers.

I claim:

1. The combination with a pneumatic tool cylinder, having a tool mounted therein and a retainer for the tool of a sleeve adapted to be disposed on the cylinder, means for clamping the sleeve to the cylinder, said means forming a pivotal support for the implement retainer.

2. The combination with a pneumatic tool cylinder of a sleeve having internal threads at one end for threaded engagement with the cylinder, said sleeve having a longitudinal slot at one end, means extending through the sleeve adjacent the slot for clamping the sleeve on the cylinder and an implement retainer pivoted to said last mentioned means.

3. The combination with a pneumatic tool cylinder of a sleeve having internal threads for threaded engagement with the cylinder, said sleeve having a longitudinal slot at one end and transverse holes on the same on opposite sides of the slot, a bolt extending through the holes for clamping one end of the sleeve to the cylinder, a nut on the bolt and trunnions on the bolt and nut and an implement retainer pivoted to said trunnions.

4. The combination with a pneumatic tool cylinder of a sleeve having internal threads for threaded engagement with the cylinder, said sleeve having a longitudinal slot at one end and transverse holes on the same on opposite sides of the slot, a bolt extending through the holes for clamping one end of the sleeve to the cylinder, a nut on the bolt, trunnions on the bolt and nut and implement retainer pivoted to said trunnions and locks on the sleeve for locking the retainer in retaining position.

In testimony whereof I have signed this specification.

WILLIAM FRANK ZIMMERMANN.